Patented Oct. 29, 1940

2,219,796

UNITED STATES PATENT OFFICE 2,219,796

ESTERS OF AMINO ALCOHOLS AND PROCESS FOR PRODUCING THEM

Pierre Viaud, Paris, France, assignor to Societe Des Usines Chimiques Rhone-Poulenc, Paris, France, a body corporate of France No Drawing. Application October 9, 1937, Serial No. 168,196. In Great Britain October 16, 1936

3 Claims. (Cl. 260—477)

This invention relates to the manufacture of a new ester of an amino alcohol having interesting therapeutic properties.

It is known that the phenyl-substituted fatty acid esters of certain branched chain aliphatic amino-alcohols possess antispasmodic action and also that basic esters of polyarylacetic acids possess an action of the same kind. It has now been found that esters of α-phenylaliphatic acids and N-disubstituted-amino-normal-aliphatic alcohols have marked spasmolytic properties, while having at the same time a particularly slight toxic action.

The object of the present invention is the preparation of a compound in which the toxic and the curative doses are more widely separated than in the known products. According to the present invention, it has been ascertained that the α-phenylvalerate of diethylaminoethanol has an especially strong spasmolytic action, both neurotropic and musculotropic, while at the same time its toxicity is minimum, so that it is particularly useful in medicinal usage.

According to the present invention the α-phenyl-valerate of N-diethylaminoethanol can be prepared either by esterification of α-phenyl-valeric acid with diethylamino-ethanol or by the action of the chloride or anhydride of the acid on diethylaminoethanol or by the action of the alkali salts of α-phenylvaleric acid on 1-diethyl-amino-2-chlorethane or by the action of diethylamine on the ester formed from α-phenylvaleric acid and glycol-monochlorhydrin.

Example 1

In a three-necked flask fitted with a reflux condenser and a stirrer is placed 0.1 gram molecular proportions of α-phenyl-n-valeryl-chloride

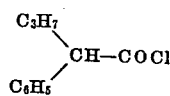

dissolved in 50 cc. of dry benzene.

0.1 gram molecular proportions of diethyl-aminoethanol dissolved in 50 cc. of dry benzene are introduced in small quantities at a time during about 10 minutes with stirring.

The mixture is heated for 3 hours at 80° C. on the water-bath with stirring. The product is cooled and the hydrochloride formed is drained and washed with benzene. The hydrochloride

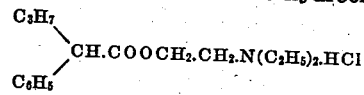

is thus obtained and has m. p. 109° C. The free base has a b. p. of 140–144° C. at 3 mm. of Hg.

Example 2

Into a 500 cc. flask with three necks provided with a mechanical stirrer and a reflux condenser are introduced 0.1 gram molecules of dry potassium α-phenyl butyrate and 75 cc. of dry benzene, and then a solution of 0–1 gram molecules of di-ethylaminochlorethane: $Cl.CH_2CH_2N(C_2H_5)_2$ in 50 cc. of dry benzene. The mixture is heated for four hours under reflux with stirring. The mineral salts are separated by washing with water and the product then rectified by distillation. The amino-ester formed

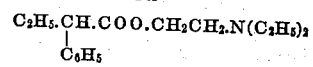

boils at 151–153° C. under 7 mm. of Hg. The hydrochloride melts at 90–92° C.

Example 3

0.2 gram molecules of diethylamine and 0.1 gram molecules of β-chlorethyl-α-phenylbutyrate

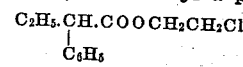

are mixed, and the mixture is heated in a sealed tube for 13–14 hours at 100° C. After cooling it is taken up with a mixture of ether and 5% hydrochloric acid. The ether is separated from the aqueous acid and the latter is rendered alkaline by the addition of sodium carbonate. The amino-ester is then extracted from the alkali lye with ether; the ethereal solution is washed with water, dried and rectified. The α-phenyl-butyrate of diethylaminoethanol previously described is thus obtained.

Example 4

0.1 gram molecules of α-phenylbutyric acid, 0.1 gram molecules of the hydrochloride of diethyl-aminochlorethane, 0.15 gram molecules of anhydrous potassium carbonate are mixed with 25 cc. acetone. The mixture is heated under a reflux condenser for 10 hours with stirring. After cooling it is filtered and the acetone retained in the filtrate removed by evaporation. The residue is taken up in ether; the ethereal solution is washed with 10% sodium carbonate and then extracted by a 5% solution of hydrochloric acid. This hydrochloride solution is rendered alkaline by sodium carbonate and extracted with ether. After evaporation of the ether and rectification, the α-phenylbutyrate of diethylaminoethanol previously described is obtained.

washed with water, dried and rectified. The amino-ester of formula:

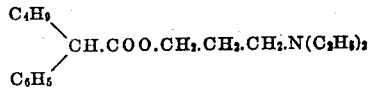

is obtained as an oil of b. p. 151–155° C. at 2 mm. of Hg.

The following esters are likewise prepared according to the present invention:

| Compound | Properties |
|---|---|
| $CH_3.CH.COOCH_2CH_2N(C_2H_5)_2$<br>   $\vert$<br>   $C_6H_5$ | B. P. 140–142° C. at 4 mm. Hg.<br>M. P. of methiodide: 80–82° C. |
| $CH_3.CH.COO.CH.CH_2CH_2N(C_2H_5)_2$<br>   $\vert$  $\vert$<br>   $C_6H_5$  $CH_3$ | B. P. 149–151° C. at 3 mm. Hg. |
| $C_2H_5.CH.COO.CH_2CH_2CH_2N(C_2H_5)_2$<br>   $\vert$<br>   $C_6H_5$ | B. P. 148–150° C. at 4 mm. Hg.<br>M. P. of methiodide: 92–93° C. |
| $C_2H_5.CH.COO.CH_2CH_2N(C_4H_9)_2$<br>   $\vert$<br>   $C_6H_5$ | M. P. of methiodide: 85° C. |
| $C_2H_5.CH.COO.CH.CH_2CH_2N(C_2H_5)_2$<br>   $\vert$  $\vert$<br>   $C_6H_5$  $CH_3$ | B. P. 165–168° C. at 6 mm. Hg. |
| $n.C_3H_7.CH.COO.CH_2CH_2CH_2N(C_2H_5)_2$<br>   $\vert$<br>   $C_6H_5$ | B. P. 150–154° C. at 2 mm. Hg.<br>M. P. of methiodide: 87–88° C. |
| $n.C_3H_7.CH.COO.CH.CH_2CH_2CH_2N(C_2H_5)_2$<br>   $\vert$  $\vert$<br>   $C_6H_5$  $CH_3$ | B. P. 173–175° C. at 6 mm. Hg. |
| $CH_2{:}CH.CH_2.CH.COOCH_2CH_2N(C_2H_5)_2$<br>   $\vert$<br>   $C_6H_5$ | M. P. of hydrochloride: 93–94° C. |
| $CH_2{:}CH.CH_2.CH.COO.CH_2CH_2CH_2N(C_2H_5)_2$<br>   $\vert$<br>   $C_6H_5$ | B. P. 155–158° C. at 3 mm. Hg.<br>M. P. of methiodide: 103–105° C. |
| $CH_2{:}CH.CH_2.CH.COO.CH.CH_2CH_2CH_2N(C_2H_5)_2$<br>   $\vert$  $\vert$<br>   $C_6H_5$  $CH_3$ | B. P. 152–153° C. at 2 mm. Hg. |
| $n\text{-}C_4H_9.CH.COO.CH_2CH_2N(C_2H_5)_2$<br>   $\vert$<br>   $C_6H_5$ | M. P. of hydrochloride: 92° C. |
| $n\text{-}C_4H_9.CH.COO.CH.CH_2CH_2CH_2N(C_2H_5)_2$<br>   $\vert$  $\vert$<br>   $C_6H_5$  $CH_3$ | B. P. 170–173° C. at 2 mm. Hg. |
| $iso\text{-}C_5H_{11}.CH.COO.CH_2CH_2N(C_2H_5)_2$<br>   $\vert$<br>   $C_6H_5$ | B. P. 160–165° C. at 8 mm. Hg. |

Example 5

0.11 gram molecules of α-phenylbutyric acid, 0.10 gram molecules of diethylaminoethanol, 80 cc. xylene and 0.13 gram molecules of benzene sulphonic acid are mixed in a three-necked flask of 500 cc. provided with a mechanical stirrer, a tap funnel and a rectifying column acting as a condenser. The mixture is boiled for 4 hours and about 500 cc. xylene is distilled off. A quantity of xylene equal to that distilled is added bit by bit. At the end of this time the xylene solution is washed with a 10% solution of sodium carbonate to remove the α-phenylbutyric acid which has not reacted. The mixture is then heated for three hours under a reflux condenser. After cooling, the mixture is extracted with 5% hydrochloric acid, and this solution extracted again with ether. The free amino-ester is liberated by the addition of 35–40 grams of sodium carbonate, extracted with ether, and the ethereal solution

What I claim and desire to secure by Letters Patent is:

1. The α-phenyl-valerate of diethylamino ethanol having the formula

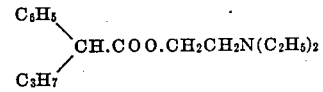

and its salts.

2. Process for the preparation of the α-phenyl-valerate of diethylaminoethanol consisting in causing a member of the group consisting of the alkali metal salts and alkaline earth salts of α-phenyl-valeric acid to react with 1-diethylamino-2-chlorethane.

3. Process for the preparation of the alpha-phenyl-valerate of diethylaminoethanol consisting in condensing, in an acetone medium, alpha-phenylvaleric acid with the hydrochloride of diethylamino-chlorethane, in the presence of an alkali-metal carbonate.

PIERRE VIAUD.